(12) United States Patent
Reidlinger et al.

(10) Patent No.: US 8,119,757 B2
(45) Date of Patent: Feb. 21, 2012

(54) POLYSILOXANE AND URETHANE MODIFIED WATER-REDUCIBLE ALKYD RESINS

(75) Inventors: Gerhard Reidlinger, Graz (AT); Edmund Urbano, Graz (AT); Ewald Zrin, Graz (AT); Johannes Scherz, Wundschuh (AT)

(73) Assignee: Cytec Surface Specialties Austria GmbH, Graz (AT)

( * ) Notice: Subject to any disclaimer, the term of this patent is extended or adjusted under 35 U.S.C. 154(b) by 0 days.

(21) Appl. No.: 12/663,107

(22) PCT Filed: May 30, 2008

(86) PCT No.: PCT/EP2008/056723
§ 371 (c)(1),
(2), (4) Date: Dec. 23, 2009

(87) PCT Pub. No.: WO2008/148716
PCT Pub. Date: Dec. 11, 2008

(65) Prior Publication Data
US 2010/0174035 A1 Jul. 8, 2010

(30) Foreign Application Priority Data
Jun. 4, 2007 (EP) .................................. 07010950

(51) Int. Cl.
*C08G 77/442* (2006.01)
*C08G 77/445* (2006.01)

(52) U.S. Cl. .................. 528/26; 526/317.1; 526/318.3; 528/29; 528/44; 528/84; 528/85; 528/306

(58) Field of Classification Search .................. None
See application file for complete search history.

(56) References Cited

U.S. PATENT DOCUMENTS

| | | | |
|---|---|---|---|
| 4,035,332 A | 7/1977 | Gomyo et al. | |
| 4,278,574 A | 7/1981 | Dworak et al. | |
| 7,141,625 B2 * | 11/2006 | Komazaki et al. | ............ 524/539 |

FOREIGN PATENT DOCUMENTS

| | | |
|---|---|---|
| EP | 0075326 B1 | 1/1987 |
| EP | 0267562 B1 | 1/1992 |
| EP | 0295403 B1 | 6/1993 |
| EP | 0758365 B1 | 4/1998 |
| EP | 0967235 A1 | 12/1999 |
| EP | 1705197 A1 | 9/2006 |
| WO | 95/27762 | 10/1995 |

OTHER PUBLICATIONS

International Search Report for PCT/EP2008/056723, dated Oct. 13, 2008.
Written Opinion for PCT/EP2008/056723.

* cited by examiner

*Primary Examiner* — Marc Zimmer
(74) *Attorney, Agent, or Firm* — Charles E. Bell

(57) ABSTRACT

Urethane and siloxane modified water-reducible alkyd resins ABCDE, comprising moieties derived from polyhydric alcohols A, modified fatty acids B made by grafting olefinically unsaturated carboxylic acids B2 onto fatty acids B1, ungrafted fatty acids C, silanol or alkoxysilyl functional siloxane oligomers or polymers D, and polyfunctional isocyanates E, a process for their production, and a method of use thereof in coating binders.

11 Claims, No Drawings

POLYSILOXANE AND URETHANE MODIFIED WATER-REDUCIBLE ALKYD RESINS

This application is the U.S. National Phase application of International Application No. PCT/EP2008/056723, filed May 30, 2008 and published as WO 2008/148716, which claims benefit of priority from European Patent Application No. 07010950.9, filed Jun. 4, 2007, each of which is incorporated by reference herein in its entirety.

The present invention relates to polysiloxane and urethane modified water-reducible alkyd resins.

Alkyd resins may be rendered water-reducible by grafting with olefinically unsaturated carboxylic acids, especially alpha-unsaturated carboxylic acids like methacrylic acid or by co-condensation with polycarboxylic acids such as tetrahydrophthalic acid or hydroxycarboxylic acids having acid groups which do not react, or only react to a small extent, under polycondensation conditions by esterification, yet impart hydrophilicity after being neutralised with alkaline compounds to provide a sufficient number of anionic groups in the resin molecules.

Water-reducible alkyd resins where fatty acids bearing grafts derived from acrylic monomers have been known, i.a. from EP-A 0 267 562, EP-A 0 295 403, and EP-A 0 758 365. The maximum value of mass fraction of solids realised with the technology described therein was approximately 45%. There is also a connection between the maximum mass fraction of solids and the degree of hydrophilic modification. A lower degree of hydrophilic modification allows a higher mass fraction of solids and improves the water and humidity resistance of the paint film, on the other hand impairs the dispersibility of the alkyd resin in water and reduces the stability of the dispersion.

When grafting olefinically unsaturated carboxylic acids onto a preformed alkyd resin, moieties derived from unsaturated fatty acids ("drying fatty acids") are attacked preferentially, which impairs the drying behaviour of such grafted resin. Co-condensation during the formation of the polyester with compounds having a functionality in excess of 2 is basically feasible, yet this may lead to the formation of branched polymers that have high viscosity and therefore need to be diluted using more solvent in order to yield resin solutions which are still easily processable. Water reducible alkyd resins that are tailored in hydrophilicity and drying behaviour according to the application envisaged have been known from EP 1 705 197 A1. These resins still need optimisation in terms of water and chemical resistance of the surface coated with coating compositions comprising such resins.

In these resins, the balance between hydrophilicity of the resin which is needed to form an aqueous dispersion, and the degree of hydrophilic modification that can be tolerated in the coating film to keep the humidity resistance at an acceptable level is determined by the amounts of fatty acids and grafted fatty acids, and the degree of grafting with acrylic acid or other unsaturated acids. It is therefore not possible to improve the water resistance of a coating film as reducing the hydrophilicity impairs the dispersibility of the resin in water, and the maximum achievable mass fraction of solids in the aqueous dispersion is also reduced.

It is therefore an object of the invention to provide a coating binder based on alkyd resins that lead to improved water resistance of the coating film without sacrificing the dispersibility, and hence, maximum mass fraction of solids of the dispersion.

During the experiments that have led to the present invention, it has been found that certain alkyl phenyl siloxane polymers or oligomers bearing silanol or alkoxysilyl groups can be added to the esterification reaction leading to the alkyds, and that inclusion of moieties derived from such siloxane polymers or oligomers leads to modified alkyd resins that display a shifted balance between hydrophilicity of the dispersed resin, and susceptibility towards water or humidity of the dried coating film.

Grafted fatty acids B that bear acid groups in the graft branches can selectively be esterified with polyhydric alcohols A or mixtures thereof so that the carboxylic acid group of the acids B2 grafted onto the fatty acids remain unesterified. These grafted fatty acids B are made by grafting olefinically unsaturated carboxylic acids B2 which preferentially carry substituents on the carbon atom in alpha position to the carboxyl group, such as methacrylic acid, ethacrylic acid (2-methylene butanoic acid or 2-ethyl acrylic acid), 2-vinyl propionic acid and tiglinic acid (trans-2,3-dimethyl acrylic acid) onto fatty acids B1.

By addition of one or more further (semi-drying or drying) fatty acids C to the grafted fatty acids B, silanol or alkoxysilyl functional siloxane polymers or oligomers D, and proper selection of the polyhydric alcohol A or in the case of a mixture of alcohols, of the composition of the alcohol mixture A, the drying behaviour of the hydroxy functional intermediate ABCD obtained by polyesterification from A, D, B, and C is controlled by the composition of the fatty acid (mixture) C, and branching is controlled by the functionality of the alcohols A. Esterification in the process to make the intermediate ABCD is conducted in a way to remove the water formed by the reaction to an extent which corresponds to the number of acid groups which shall be esterified, leaving out, of course, those acid groups which are attached to the olefinically unsaturated carboxylic acids B2 forming the graft branches. This allows to selectively esterify only the acid groups of the fatty acids B1 and C, but not those of B2.

The hydroxy functional, siloxane-modified intermediates ABCD can be reacted with a polyfunctional isocyanate E, without addition of a solvent, where only the hydroxyl groups are added to the isocyanate groups under formation of a urethane bond, without decarboxylation occurring by reaction of isocyanates with the residual carboxylic acid groups in ABCD.

The invention therefore relates to urethane and siloxane modified water-reducible alkyd resins ABCDE, comprising moieties derived from polyhydric alcohols A, modified fatty acids B made by grafting olefinically unsaturated carboxylic acids B2 onto fatty acids B1, ungrafted fatty acids C, silanol or alkoxysilyl functional siloxane oligomers or polymers D, and polyfunctional isocyanates E.

In another embodiment of the invention, it is also possible to react the intermediate ABCD with a dicarboxylic or tricarboxylic acid F or an anhydride thereof such as phthalic anhydride or trimellithic anhydride, tetrahydrophthalic acid anhydride, maleic anhydride, adipic acid, malonic acid, oxalic acid, and succinic acid or its anhydride, in order to increase its molar mass before reaction with the polyfunctional isocyanate E, yielding a product ABCDEF.

The invention further relates to a process for the synthesis of siloxane- and urethane-modified water-reducible alkyd resins ABCDE and ABCDEF, comprising moieties derived from polyhydric alcohols A, modified fatty acids B made by grafting olefinically unsaturated carboxylic acids B2 onto fatty acids B1, ungrafted fatty acids C, hydroxy-functional siloxane oligomers or polymers D, optionally, di- or tricarboxylic acids F or anhydrides thereof, and polyfunctional isocyanates E. For the sake of simplicity, products ABCDEF will be comprised by mention of products ABCDE hereinafter.

According to this process, in a first step, fatty acids B1 are grafted with olefinically unsaturated carboxylic acids B2 which preferably carry, in the alpha position relative to the carboxyl group, a substituent selected from the group consisting of linear, branched, and cyclic alkyl radicals having from 1 to 8 carbon atoms, and aryl radicals having from 5 to 10 carbon atoms which may optionally be substituted with one of the alkyl radicals mentioned supra. In the grafting step, in addition to the acids B2, other olefinically unsaturated monomers B3 capable of radical copolymerisation may also be grafted onto the fatty acids B1, selected from the group consisting of olefinically unsaturated carboxylic acids B31 such as acrylic acid, monoesters B32 of aliphatic alcohols and olefinically unsaturated dicarboxylic acids such as monomethyl maleinate, esters B33 of aliphatic alcohols and the olefinically unsaturated carboxylic acids B34 such as methyl (meth)-acrylate, ethyl (meth)acrylate, isobutyl (meth)acrylate, and 2-ethylhexyl(meth)acrylate, as well as diesters of olefinically unsaturated dicarboxylic acids such as dimethyl maleinate, hydroxy functional esters B35 of di- and polyhydric alcohols and the olefinically unsaturated carboxylic acids mentioned as B31, such as hydroxyethyl (meth)acrylate and hydroxypropyl (meth)acrylate, and aromatic vinyl compounds B36 such as styrene, p-methylstyrene and vinyl toluene, and other vinyl compounds B37 such as vinyl acetate, vinyl chloride, and (meth)acrylonitrile.

In the second step, the grafted fatty acids B are esterified with di- or polyhydric alcohols A, hydroxy-functional siloxane oligomers or polymers D and ungrafted fatty acids C which have a minimum content of olefinic double bonds of 1.97 mol/kg, corresponding to an iodine number of 50 cg/g, under removal of the water formed in the reaction. The amounts of substance and functionalities of the educts used are chosen such that the condensation products have an average hydroxyl functionality of at least 1.1, preferably from 1.5 to 3.0, and especially preferred, at least 1.9.

Optionally, the intermediate ABCD is then reacted with a di- or tricarboxylic acid or its anhydride, F, under formation of $(ABCD)_nF$ which again is hydroxy functional, and where n is 2 or 3.

In another embodiment of the invention, it is also possible to perform a transesterification of vegetable oils, such as soybean oil, sunflower oil, safflower oil, linseed oil, rapeseed oil, and cottonseed oil, which are esters of the fatty acids C, with the polyhydric alcohols A and esterifying the resulting monoesters of the polyhydric alcohols A, together with the siloxane oligomers or polymers, D, with the grafted fatty acids B and further dicarboxylic or tricarboxylic acids F or anhydrides thereof in order to increase its molar mass, which process yields an intermediate $(ABCD)_nF$.

In the third step, these hydroxy functional condensation products ABCD or $(ABCD)_nF$ are reacted with polyfunctional isocyanates E under polyaddition to form urethanes. Then, the remaining carboxyl groups of the adducts ABCDE (which abbreviation also comprises, as detailed hereinbefore, the adducts $(ABCD)_nFE$, are at least partly neutralised and the neutralised adducts converted to the aqueous phase.

The di- or polyhydric alcohols A are aliphatic linear or branched alcohols having from 3 to 12 carbon atoms and at least two hydroxyl groups, such as ethylene glycol, 1,2- and 1,3-propylene glycol, 1,4-butane diol, 1,6-hexane diol, neopentyl glycol, diethylene glycol, dipropylene glycol, and other ether alcohols derived from these. Preferred polyhydric alcohols are glycerol, trimethylol ethane, trimethylol propane, digylcerol, ditrimethylol ethane and ditrimethylol propane, erythritol, pentaerythritol, dipentaerythritol and sugar alcohols such as sorbitol, mannitol, and arabitol.

The grafted fatty acids B are derived from fatty acids B1 grafted with olefinically unsaturated carboxylic acids B2, and optionally, further olefinically unsaturated monomers B3 as mentioned supra.

The fatty acids B1 according to the invention are at least mono-olefinically unsaturated aliphatic monocarboxylic acids, having from 4 to 24 carbon atoms. Among these unsaturated fatty acids, mention is made of lauroleic, myristoleic, palmitoleic, oleic, gadoleic, erucic, and ricinoleic acids, and of linoleic and linolenic acids. It is also possible to use mixtures of fatty acids prepared from vegetable oils such as soy bean oil fatty acid, linseed oil fatty acid, sunflower oil fatty acid, safflower oil fatty acid, rubber seed oil fatty acid and tall oil fatty acid.

The olefinically unsaturated carboxylic acids B2 preferably carry a substituent in alpha position with relation to the carboxyl group, which substituent is selected from the group consisting of linear, branched, and cyclic alkyl radicals having from 1 to 8 carbon atoms and of aryl radicals having from 5 to 10 carbon atoms which may additionally be substituted with the aforementioned alkyl radicals. It is further preferred that these acids have at least one free carboxyl group, particularly preferably not more than one carboxyl group. Examples of these acids are acrylic acid, methacrylic acid, vinyl acetic acid, crotonic and isocrotonic acid, the dicarboxylic acids maleic and fumaric acid, citraconic, mesaconic and itaconic acid, as well as their monoesters with linear, branched or cyclic alkanols having from 1 to 20 carbon atoms, particularly preferred are those monocarboxylic acids having a substituent in the alpha position such as methacrylic acid, ethacrylic acid, 2-vinyl propionic acid, and tiglinic acid. The most preferred acid is methacrylic acid. It is, however, also possible to use acrylic acid alone, or preferably, in mixture with methacrylic acid.

The ungrafted fatty acids C may be selected from the unsaturated fatty acids as cited under B1, and also from saturated fatty acids having from 6 to 30 carbon atoms such as caproic acid, caprylic acid, 2-ethyl hexanoic acid, capric acid, lauric acid, myristic acid, palmitic acid, stearic acid, arachidic acid, behenic acid, and lignoceric acid. Further, the fatty acids C may also be selected from mixtures of fatty acids which are based on naturally occurring fats, such as cotton seed oil fatty acid, peanut oil fatty acid, coconut oil fatty acid, linseed oil fatty acid, palm kernel oil fatty acid, olive oil fatty acid, palm oil fatty acid, castor oil fatty acid, rapeseed oil fatty acid, safflower oil fatty acid, soybean oil fatty acid, and tall oil fatty acid. It is likewise possible to use isomerised fatty acids where the double bonds are in conjugated position, such as isomerised polyunsaturated fatty acids made from sunflower oil or soy bean oil fatty acids (conjugated fatty acids). The fatty acids C used should be selected in a way that there is a minimum of content of olefinic double bonds in the acid or in the acid mixture of 3.15 mol/kg.

The silanol or alkoxysilyl functional siloxane oligomers or polymers D are linear or branched, preferably linear, and have structures of formula I

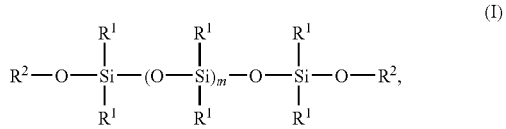

$R^1 = C_1$- to $C_4$-alkyl, or $C_1$- to $C_4$-isoalkyl, or phenyl
$R^2 = H$, or methyl, or ethyl where the residues $R^1$ can be the same or can be different and are selected from the group consisting of linear or branched alkyl having from 1 to 4 carbon atoms or phenyl, where the silicon atoms forming the chain are substituted with alkyl or phenyl groups. $R^2$ may be H— in case of silanol functional siloxane oligomers or the terminal silicon atom of such oligomer may also carry a alkoxy group which may preferably be a methoxy or an ethoxy group. Particularly preferred are siloxane polymers where as the residues $R^1C_1$- to $C_4$-alkyl together with phenyl residues are present.

The polyfunctional isocyanates E which are used according to the invention are selected from aromatic and aliphatic isocyanates, preferably diisocyanates, such as toluylene diisocyanate (TDI), bis-(4-isocyanatophenyl)methane (MDI), tetramethyl xylylene diisocyanate (TMXDI), bis-(4-isocyanatocyclohexyl)methane (HMDI), 1,6-diisocyanatohexane (HDI), and isophorone diisocyanate (IPDI). Mixtures of these may also be used.

The dicarboxylic or tricarboxylic acids F may be aliphatic linear, branched, or cyclic, and aromatic in nature, and may preferably be selected from the group consisting of phthalic acid, trimellithic acid, tetrahydrophthalic acid, maleic acid, adipic acid, malonic acid, oxalic acid, succinic acid, and the anhydrides thereof, to the extent that they exist.

In the process according to the invention, in the first step, fatty acids B1 or a mixture of such fatty acids are grafted with the olefinically unsaturated carboxylic acids B2, and optionally, monomers B3, preferably in the presence of radical initiators, such as peroxides, at a temperature of from 80° C. to 160° C., optionally in solution. The increase in acid number which is effected by the graft procedure ranges approximately from an additional 80 mg/g to 250 mg/g, preferably from 100 mg/g to 150 mg/g.

The acid number is defined according to DIN EN ISO 2114 (formerly DIN 53 402) as the ratio of the mass m KOH of potassium hydroxide needed to neutralise the sample under analysis, and the mass m B of this sample (mass of the solids of the sample if this is a solution or dispersion); the customary unit is "mg/g".

In the second step, the grafted fatty acids B of the first step are esterified with polyhydric alcohols A, with the silanol or alkoxysilyl functional siloxane oligomer or polymers D, and optionally, with ungrafted fatty acids C which have a minimum content of olefinic double bonds of 1.97 mol/kg, preferably of at least 3.15 mol/kg, and particularly preferred, of at least 4.73 mol/kg, corresponding to an iodine number of at least 50 cg/g, preferably at least 80 cg/g, and particularly preferred, of at least 120 cg/g, under removal of water formed in the reaction. The amounts of substance and functionalities of the educts used are preferably chosen such that the condensation products ABCD have an average hydroxyl functionality of at least 1.1, preferably at least 1.9, and particularly preferred, at least 2.0. In the case of the preferred trihydric alcohols, this corresponds to equal amounts of substance (the SI unit of which is "mol") of (monocarboxylic) fatty acids to trihydric alcohols. If additional (ungrafted) fatty acids C are added, 1 mol of trihydric alcohol must be added for each 1 mol of fatty acid, as an example.

In a further preferred embodiment, the monoesters of the trihydric alcohols may be mixed with diesters of tetrahydric alcohols or tetraesters of hexahydric alcohols. This allows to increase the amount of fatty acids introduced into the alkyd; if drying fatty acids are used herein, the oil length of the alkyd can be increased to from 40% up to 60%, without adversely affecting the hydrophilicity.

Optionally, the intermediates ABCD can be reacted with a polybasic acid, preferably a di- or tri-functional acid, F, before the reaction with the isocyanate. This esterification is best effected with an acid anhydride, and optionally in the presence of catalysts such as titanium alkoxides because transesterification should be kept at a low level in this step. Catalysts that do not form coloured salts are preferred here. The number of carboxyl groups of component F added in this reaction should be a maximum of 50% of the number of hydroxyl groups in the intermediate ABCD. This modification allows to limit the amount of urethane bonds in the final product, to a range of mass fraction of urethane groups (—O—CO—NH—) of from 1% to about 25%. A compound $(ABCD)_nF$ is thereby formed which is hydroxy functional, and where n is 2 or 3. For the sake of brevity this is referred to as ABCDF herein below.

In the third step, the hydroxy functional condensation products ABCD or ABCDF are reacted with polyfunctional isocyanates E under polyaddition to form urethanes. As the hydroxy functional intermediates are oligomeric in nature, this can be effected in bulk, i.e. without addition of solvents. The reaction can be accelerated by increasing the temperature to not more than 120° C. It has been found that reaction temperatures higher than 130° C. facilitate the decarboxylation reaction occurring between the isocyanates and the carboxylic acid groups that have remained of the acids B2. On the other hand, temperatures of less than 70° C. are not recommended because the reaction rate is too low. Optimum properties of the modified alkyd resins are achieved if the mass fraction of urethane groups (—O—CO—NH—) is from 1% to 10%, based on the mass of the resins ABCDE.

Then, the adduct ABCDE or ABCDFE is neutralised and converted to the aqueous phase. This is done by using basic compounds such as alkali hydroxides, lithium hydroxide being preferred, and preferably with a volatile base, such as organic amines, or ammonia. It is possible to add the basic compound dissolved in water, to the reaction product ABCDE or ABCDFE, and transfer the mixture into water; another possibility is to add the basic compounds to water and to feed the reaction product into the stirred aqueous solution of the said basic compound. The degree of neutralisation needed depends on the nature of the fatty acids and alcohols, as well as on the degree of grafting, and is preferably from 30% to 100%, particularly preferably from 50% to 85%. The degree of neutralisation is the ratio of neutralised acid groups (acid anions) to the total number of acid groups, neutralised and non-neutralised. Aqueous binder dispersions having a mass fraction of solids of from 35% to 55%, preferably from 40% to 50%, can be prepared by this technology.

The urethane and siloxane modified grafted alkyds ABCDE or ABCDFE according to the present invention offer a wider range of properties, because the polymer structure can be tailored to the application. It has been found that a mass fraction of poly- or oligo-siloxane derived moieties in the modified alkyds of between 1% and 10% give the best results. Lower siloxane content does not contribute to an increase in water and humidity resistance of the coating films, while higher siloxane content leads to surface irregularities in the coating films. Binders prepared from these resins can be used to prepare paints for a wide range of substrates from wood to leather, textiles, paper, and cardboard, and also metals and mineral substrates such as stone, concrete, or plaster. Coatings prepared with the alkyd resins of the present invention show good adhesion, high flexibility, fast drying, and little discolouration. At a given degree of hydrophilic modification, compared to earlier technologies, the resistance to water and humidity have been improved.

The invention is further described in the Examples which are not intended to be limiting. In the examples, and in the specification, all ratios or fraction measured in "%" are mass fractions ("%"="cg/g"). A concentration or strength measured in "%" is the mass fraction w z of solute Z in the solution, which is the ratio of the mass m z of solute Z to the mass of the solution m.

EXAMPLES

Example 1

71 g of linseed oil fatty acid were charged in a reactor and heated to 140° C. A monomer mixture consisting of 60 g of isobutyl methacrylate, 10 g of para methyl styrene and 30 g of acrylic acid together with 4 g of di-tert.-butyl peroxide was added continuously over eight hours. The mixture was kept at 140° C. thereafter until a conversion to polymer of at least 99% had been reached, as witnessed by the mass fraction of solids. Finally, the reaction mixture was diluted with xylene. The solution had a mass fraction of solids of 85%, and an acid number of 210 mg/g.

COMPARATIVE EXAMPLE

As comparative example serves an unmodified alkyd emulsion according to example 2 without silicone. It was adjusted to the similar final values as example 2 with a mass fraction of solids of 39%, a dynamic viscosity, measured at 23° C. and a shear rate of 10 s$^{-1}$, of 3900 mPa·s, an average particle size of 130 nm, an acid number of 68 mg/g, and a pH of 8.4, measured at 10% strength in water.

Example 2

230 g of the grafted fatty acid of Example 1 were charged to a reactor, together with 67 g of trimethylol propane, 20 g of a phenyl propyl siloxane (hydroxy functional; molar mass between 1500 g/mol and 2500 g/mol; ratio of amount of substance of phenyl substituents to amount of substance of propyl substituents: 2.3 mol/mol), and 70 g of sunflower oil fatty acid, and heated to 175° C. The mixture was kept under esterification conditions at a constant temperature of 175° C. under removal of water by azeotropic distillation with xylene until an acid number of approximately 75 mg/g had been reached. All solvent was then removed by distillation under reduced pressure. Within thirty minutes, 30 g of toluylene diisocyanate were added at 70° C., the temperature slowly rising due to the exothermic reaction to 100° C. At this temperature, the reaction was continued until a Staudinger index (as measured in chloroform solution at 23° C.) of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 580 ml of water and 15 g of an aqueous ammonia solution of 25% strength, yielding an aqueous emulsion of the binder with a mass fraction of solids of 37%, a dynamic viscosity measured at 23° C. and a shear rate of 10 s$^{-1}$ of 9500 mPa·s, an average particle size of 150 nm, an acid number of 70 mg/g, and a pH of 8.5, measured at 10% strength in water.

Example 3

373 g of soybean oil and 98 g of pentaerythritol were transesterified at 260° C. using 0.05 g of lithium hydroxide as a catalyst. When a sample was completely dissolved in ethanol to form a single phase, the mixture was cooled to 180° C., 89 g of phthalic anhydride were added and esterification was continued at 225° C. until an acid number of 5 mg/g was reached. Thereafter, 430 g of the grafted fatty acid of example 1 and 46 g of a phenyl propyl siloxane (as in Example 2) were added at 160° C., and the mixture was heated to 175° C. At this temperature, esterification was continued until an acid number of 56 mg/g was reached, the water formed being removed by azeotropic distillation with xylene. All residual solvent was then removed by distillation under reduced pressure. Within thirty minutes, 78 g of isophorone diisocyanate were added at 70° C., the temperature slowly rising due to the exothermic reaction to 90° C. At this temperature, the reaction was continued as in Example 4 until a Staudinger index of 11.2 cm$^3$/g was reached. No residual free isocyanate was left after reaching this desired value of the Staudinger index. Then, the solid resin was emulsified by adding 1375 ml of water and 51 g of ammonia (25% strength solution in water), yielding an aqueous emulsion of the binder with a mass fraction of solids of 42%, a dynamic viscosity measured at 23° C. and a shear rate of 10 s$^{-1}$ of 7800 mPa·s, an average particle size of 110 nm, an acid number of 54 mg/g, and a pH of 8.5, measured at 10% strength in water.

Example 4

56 g of soybean oil and 40 g of trimethylol propane were transesterified at 260° C. using 0.01 g of lithium hydroxide as a catalyst. When a sample was completely dissolved in ethanol to form a single phase, the mixture was cooled to 180° C., 91 g of phthalic anhydride, 47 g of trimethylol propane and 23 g of benzoic acid were added and esterification was continued at 230° C. until an acid number of 3 mg/g was reached. Thereafter, 202 g of the grafted fatty acid of example 1 and 24 g of a phenyl propyl siloxane (as in Example 2) were added at 160° C., and the mixture was heated to 175° C. At this temperature, esterification was continued until an acid number of 60 mg/g was reached, the water formed being removed by azeotropic distillation with xylene. All residual solvent was then removed by distillation under reduced pressure. Within thirty minutes, 34 g of isophorone diisocyanate were added at 70° C., the temperature slowly rising due to the exothermic reaction to 90° C. At this temperature, the reaction was continued as in Example 4 until a Staudinger index of 11.5 cm$^3$/g was reached. No residual free isocyanate was left after reaching this desired value of the Staudinger index. Then, the solid resin was emulsified by adding 640 ml of water and 23.7 g of ammonia (25% strength solution in water), yielding an aqueous emulsion of the binder with a mass fraction of solids of 41%, a dynamic viscosity measured at 23° C. and a shear rate of 10 s' of 6500 mPa·s, an average particle size of 115 nm, an acid number of 56 mg/g, and a pH of 8.3, measured at 10% strength in water.

Example 5

56 g of soybean oil and 40 g of trimethylol propane were transesterified at 260° C. using 0.01 g of lithium hydroxide as a catalyst. When a sample was completely dissolved in ethanol to form a single phase, the mixture was cooled to 180° C., 91 g of phthalic anhydride, 47 g of trimethylol propane and 23 g of benzoic acid were added and esterification was continued at 230° C. until an acid number of 3 mg/g was reached. Thereafter, 202 g of the grafted fatty acid of example 1 and 33 g of a methoxy functional methyl phenyl siloxane (molar mass approximately 1700 g/mol, mass fraction of hydroxyl groups approximately 3.7%) were added at 160° C., and the mixture was heated to 175° C. At this temperature, esterification was continued until an acid number of 62 mg/g was reached, the water and methanol formed being removed by azeotropic distillation with xylene. All residual solvent was then removed by distillation under reduced pressure. Within thirty minutes, 35 g of isophorone diisocyanate were added at 70° C., the temperature slowly rising due to the exothermic reaction to 90° C. At this temperature, the reaction was continued as in Example 4 until a Staudinger index of 11.0 cm$^3$/g was reached. No residual free isocyanate was left after reaching this desired value of the Staudinger index. Then, the solid resin was emulsified by adding 650 ml of water and 23.5 g of ammonia (25% strength solution in water), yielding an aqueous emulsion of the binder with a mass fraction of solids of 40%, a dynamic viscosity measured at 23° C. and a shear rate of 10 s$^{-1}$ of 4800 mPa·s, an average particle size of 105 nm, an acid number of 55 mg/g, and a pH of 8.4, measured at 10% strength in water.

The resins obtained according to the Examples 2 to 5 and the resin of the Comparative Example were used to formulate coating compositions based on the same resin solids according to the recipes of table 1.

TABLE 1

| Paint composition of Wood Stains (mass of the components in g) | |
| --- | --- |
| Alkyd Emulsion, resin solids | 100 |
| Methylethylketoxim (antiskin additive) | 0.3 |
| Defoamer (based on mineral oil) | 1 |
| water-borne ycmbination siccative comprising Co, Zr, and Li | 3 |
| deionised water | 3 |
| Polyurethane thickener (HEUR) | 3 |
| Pigment Paste: ® Luconyl Yellow 1916 (BASF) | 5 |
| Methoxypropoxypropanol | 5 |
| deionised water | 160 |
| mass fraction of solids in % | 25 |
| viscosity DIN EN ISO 3219 @ 23° C. shear rate 100/s in mPa · s | 140 |

The wood stain compositions were applied three times on spruce and tested for UV and water resistance. The quality of the surface was checked after exposure in Arizona and artificial weathering in UVCON. An un-modified alkyd emulsion according to example 2 without silicone served as comparative example. The following results were obtained:

TABLE 2

| Testing of wood stains | | | | | |
| --- | --- | --- | --- | --- | --- |
| | Wood stain | | | | |
| | Ex. 6 | Ex. 7 | Ex. 8 | Ex. 9 | Ex. 10 |
| Alkyd emulsion from | Ex. 2 | Ex. 3 | Ex. 4 | Ex. 5 | Comp. Ex. |
| Silicone (% on solids) | 2.6 | 8.8 | 4.6 | 2.2 | 0 |
| Tack-free time 2$^{nd}$ coat (hours) | 12 | 10 | 10 | 24 | 15 |
| Gloss @ 60° Initial value | 40 | 36 | 44 | 40 | 35 |
| Gloss @ 60° after 500 h UVCON | 38 | 35 | 40 | 38 | 19 |
| Gloss @ 60° after 1000 h UVCON | 32 | 30 | 33 | 30 | 12 |
| Water beading test (after 1000 h UVCON, contact 5 minutes) | 2 | 2 | 3 | 2 | 4 |
| Arizona testing @ total radiation: 9550 MJ | 9 | 8 | 8 | 7 | 6 |

UVCON was tested with a UC 327 (ATLAS) with an exposure cycle of 4 hours UVB and 4 hours condensation stage with 100% relative humidity.

The evaluation of the exposed samples was done according to DIN EN ISO 4628-2 with a range of 1 (best) to 5 (worst) for water beading test and of 10 (unaffected) to 0 (destroyed) for the Arizona testing.

As can be seen, already a mass fraction of 2% of siloxane derived moieties in the binder leads to a marked improvement in water resistance. This effect increases until a mass fraction of 10% is reached. Also appearance after exposing to UV light (UVCON) and results of testing the panels in Arizona were remarkably improved.

At 15% silicone derived moieties in the resin, surface irregularities which lead to craters and fish eyes and poor interlayer adhesion of the second and third coat were observed, therefore those samples were not included in weathering tests.

The invention claimed is:

1. Urethane and siloxane modified water-reducible alkyd resins ABCDE, comprising moieties derived from:
   (i) polyhydric alcohols A,
   (ii) modified fatty acids B made by grafting olefinically unsaturated carboxylic acids B2 onto fatty acids B1,
   (iii) ungrafted fatty acids C,
   (iv) alkoxysilyl functional siloxane oligomers or polymers D, and
   (v) polyfunctional isocyanates E,
wherein the mass fraction of poly- or oligo-siloxane derived moieties in the modified alkyd resins is between 1% to 10% based on the mass of the resins ABCDE.

2. The urethane and siloxane modified water-reducible alkyd resins ABCDE of claim 1, further comprising moieties derived from dicarboxylic or tricarboxylic acids F or anhydrides thereof.

3. The urethane and siloxane modified water-reducible alkyd resins ABCDE of claim 1, wherein the olefinically unsaturated carboxylic acids B2 carry a substituent in the alpha position to the carboxyl group, said substituent being selected from the group consisting of: linear, branched, or cyclic alkyl radicals having from 1 to 8 carbon atoms, and aryl radicals having from 5 to 10 carbon atoms.

4. The urethane and siloxane modified water-reducible alkyd resins ABCDE of claim 1, wherein the fatty acids B1 are at least mono-olefinically unsaturated monocarboxylic acids having from 4 to 24 carbon atoms.

5. The urethane and siloxane modified water-reducible alkyd resins ABCDE of claim 1, wherein the ungrafted fatty acids C are selected from the group consisting of at least mono-olefinically unsaturated monocarboxylic acids having from 4 to 24 carbon atoms, and saturated fatty acids having from 6 to 30 carbon atoms, with the proviso that the ungrafted fatty acids C or a mixture thereof have a minimum content of double bonds of 3.15 mol/kg.

6. The urethane and siloxane modified water-reducible alkyd resins ABCDE of claim 1, wherein the mass fraction of urethane groups is from 1% to 10%, based on the mass of the resins ABCDE.

7. The urethane and siloxane modified water-reducible alkyd resins ABCDE of claim 1, wherein the degree of neutralisation in an aqueous dispersion thereof is from 30% to 100%.

8. A process for the production of aqueous dispersions of urethane and siloxane modified water-reducible alkyd resins ABCDE of claim 1, comprising the steps of:
   grafting fatty acids B1 with olefinically unsaturated carboxylic acids B2, thereby forming grafted fatty acids B;
   esterifying the grafted fatty acids B with polyhydric alcohols A, alkoxysilyl functional siloxane oligomers, or polymers D and ungrafted fatty acids C which have a minimum content of olefinic double bonds of 1.97 mol/kg, under removal of the water formed in the reaction, wherein the amounts of substance and functionalities of the educts used in this step are chosen such that the condensation products have an average hydroxyl functionality of at least 1.1, reacting these hydroxy functional condensation products ABCD with polyfunctional isocyanates E under polyaddition to form the respective urethanes, and at least partly neutralising the remaining carboxyl groups of the adducts ABCDE and converting the neutralised adducts to the aqueous phase.

9. The process of claim 8 wherein the condensation products ABCD are reacted, before the neutralising step, with a di- or tricarboxylic acid or its anhydride, F, under formation of $(ABCD)_n F$ which is hydroxy functional, and where n is 2 or 3.

10. A method of using the urethane modified alkyd resins of claim 1 as binders in paints for coating wood, leather, textiles, paper, cardboard, metals, and mineral substrates, the method comprising: adding the resin to a paint; and coating a substrate.

11. A method of using the urethane modified alkyd resins of claim 2 as binders in paints for coating wood, leather, textiles, paper, cardboard, metals, and mineral substrates, the method comprising: adding the resin to a paint; and coating a substrate.

* * * * *